(12) United States Patent
Schauss

(10) Patent No.: US 6,512,636 B2
(45) Date of Patent: Jan. 28, 2003

(54) ANAMORPHIC LENS FOR DIGITAL PROJECTION

(75) Inventor: Udo Schauss, Waldbööckelheim (DE)

(73) Assignee: Josef Schneider Optische Werke GmbH, Bad Kreuznach (DE)

( * ) Notice: Subject to any disclaimer, the term of this patent is extended or adjusted under 35 U.S.C. 154(b) by 58 days.

(21) Appl. No.: 09/850,880

(22) Filed: May 8, 2001

(65) Prior Publication Data

US 2002/0118466 A1 Aug. 29, 2002

(30) Foreign Application Priority Data

Dec. 1, 2000 (DE) .......................... 100 60 072

(51) Int. Cl.⁷ .................... G02B 13/08; G02B 13/12; G02B 13/18
(52) U.S. Cl. .................... 359/668; 359/670; 359/671; 359/710
(58) Field of Search .................... 359/668, 670, 359/671, 710

(56) References Cited

U.S. PATENT DOCUMENTS

| | | | | |
|---|---|---|---|---|
| 1,962,892 A | * | 6/1934 | Chretien | 359/671 |
| 2,933,017 A | * | 4/1960 | Kingslake et al. | 359/671 |
| 2,956,475 A | * | 10/1960 | Harris et al. | 359/668 |
| 3,517,984 A | * | 6/1970 | Lindstedt et al. | 359/671 |
| 3,682,533 A | * | 8/1972 | Vetter | 359/671 |
| 3,871,748 A | * | 3/1975 | Day | 359/670 |
| 3,924,933 A | * | 12/1975 | Hirose | 359/670 |
| 4,362,366 A | * | 12/1982 | Gottschalk | 359/671 |
| 4,509,832 A | | 4/1985 | Jacobsen | 359/669 |
| 5,184,880 A | | 2/1993 | Lisziewicz | 359/668 |
| 5,339,193 A | * | 8/1994 | Korpert et al. | 359/819 |
| 5,930,050 A | | 7/1999 | Dewald | 359/670 |
| 6,310,731 B1 | * | 10/2001 | Wartmann et al. | 359/668 |
| 2002/0097506 A1 | * | 7/2002 | Schauss | 359/757 |

* cited by examiner

Primary Examiner—Georgia Epps
Assistant Examiner—David N. Spector
(74) Attorney, Agent, or Firm—Collard & Roe, P.C.

(57) ABSTRACT

An anamorphic lens for a digital projection display system comprising a projection lens and an optical axis has an anamorphic factor between 1.3 and 2.0. The anamorphic lens includes a first afocal part placed in front of the projection lens and a second part placed behind the projection lens. The first part comprises a plurality of lens elements configured for magnification in a first direction transverse to the optical axis. The second part comprises at least one element configured for magnification in a second direction perpendicular to the first direction.

4 Claims, 4 Drawing Sheets

ANAMORPHIC LENS FOR DIGITAL PROJECTION

BACKGROUND OF THE INVENTION

1. Field of the Invention

The present invention relates to optical systems used in digital projection systems and more particularly to a compact anamorphic lens having two components which widens the image by a factor of 1.3 to 2.0.

2. The Prior Art

In digital projection, liquid crystal devices (LCDS) and digital mirror devices (DMDs) which have an aspect ratio of 4 to 3 or 5 to 4 are normally used. Consequently, projection with non-anamorphic lens produces images with the same aspect ratio as these devices. These projection formats, however, do not correspond to the best psychological visual perception of the human being. In order to more closely approximate this visual perception, it is desirable to widen the horizontal dimension of the images. Such widening can be accomplished with anamorphic lens. Anamorphic optical systems, also called anamorphotes, differ from traditional lens primarily in that the focal length in the horizontal direction markedly deviates from the focal length in the vertical direction. The ratio of these two focal lengths is called the anamorphic factor.

In U.S. Pat. No. 5,930,050, a lens of this kind is described. This lens exhibits an excellent state of correction. This result was achieved by a five-lens element afocal supplementary lens, the partial refractive powers of which, compared with other anamorphotes available on the market, were significantly relaxed. This arrangement, however, as the professional knows, leads to an enlargement of the height and of the diameters of the anamorphic lens, which in turn greatly increases the cost of its manufacture.

SUMMARY OF THE INVENTION

In accordance with the invention, a compact, anamorphic lens with high efficiency is produced at a reasonable cost. The lens has a first afocal component B1 in front of the projection lens which in turn has two subcomponents U1 and U2. Each subcomponent has high refractive power in the horizontal direction. The lens also has a second component B2 placed behind the projection lens, which has very little refractive power in the vertical direction. The anamorphic lens widens the image by a factor of 1.3 to 2.0.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
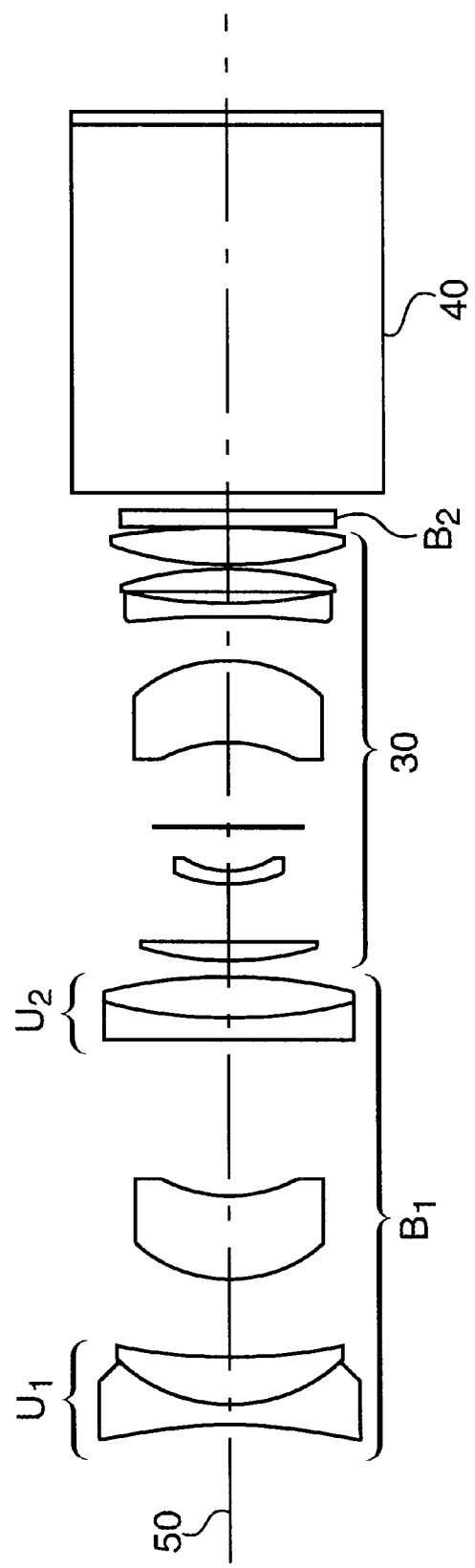
FIG. 1 is a schematic view in horizontal cross-section of an optical system including an anamorphic lens in accordance with the invention in conjunction with a projection lens.
Figure 2:
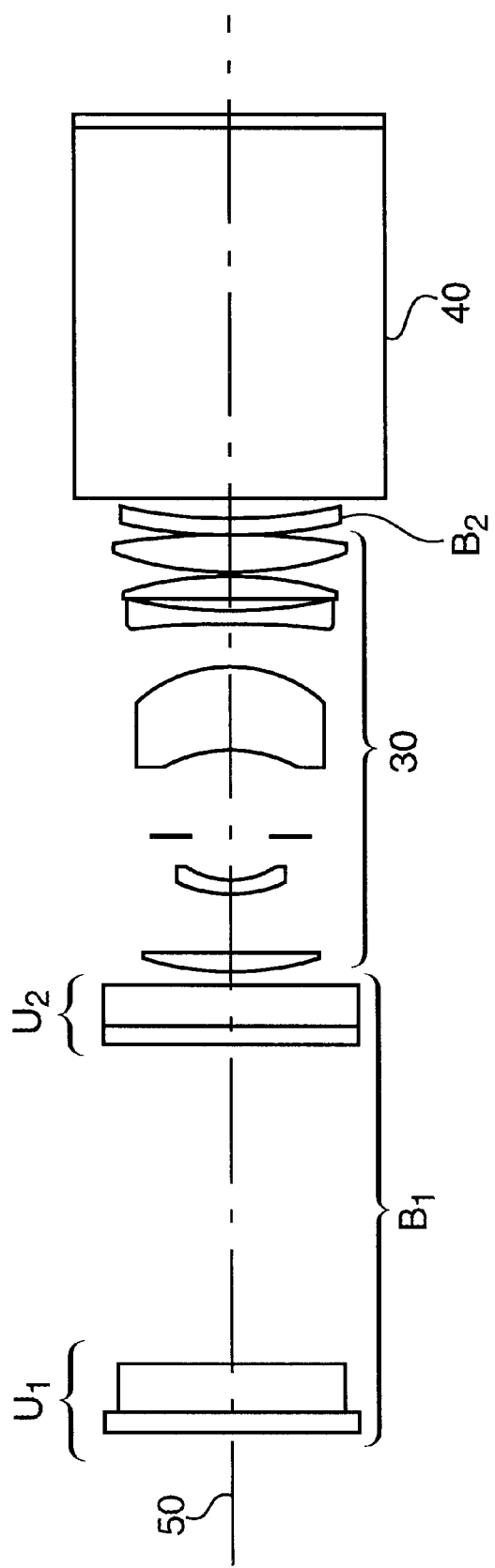
FIG. 2 is a schematic view in vertical cross-section of the embodiment of FIG. 1.
Figure 3:
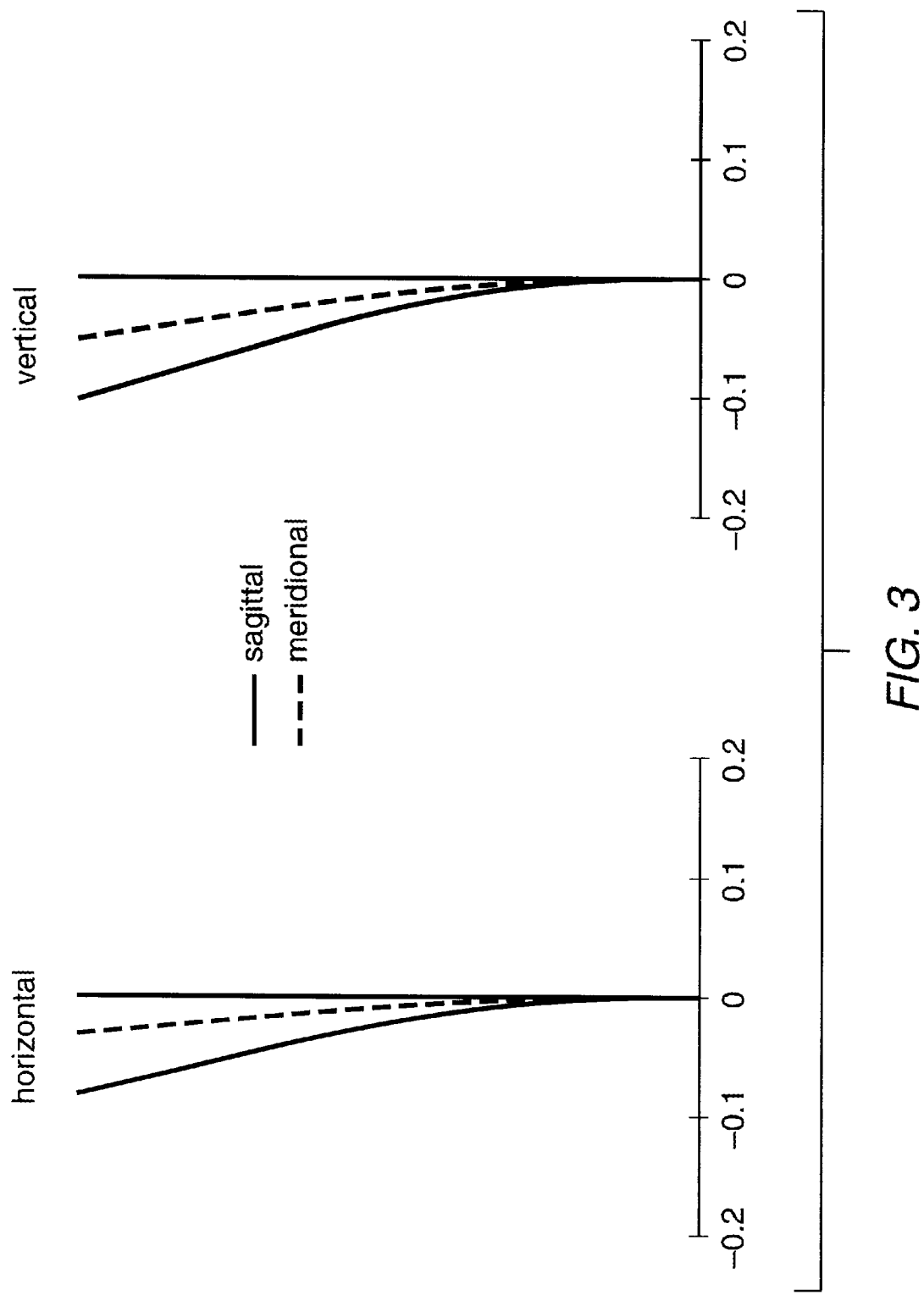
FIG. 3 are field curvature curves showing deviation in the sagittal and meridional image plane of the anamorphic lens of operational example 1.
Figure 4:
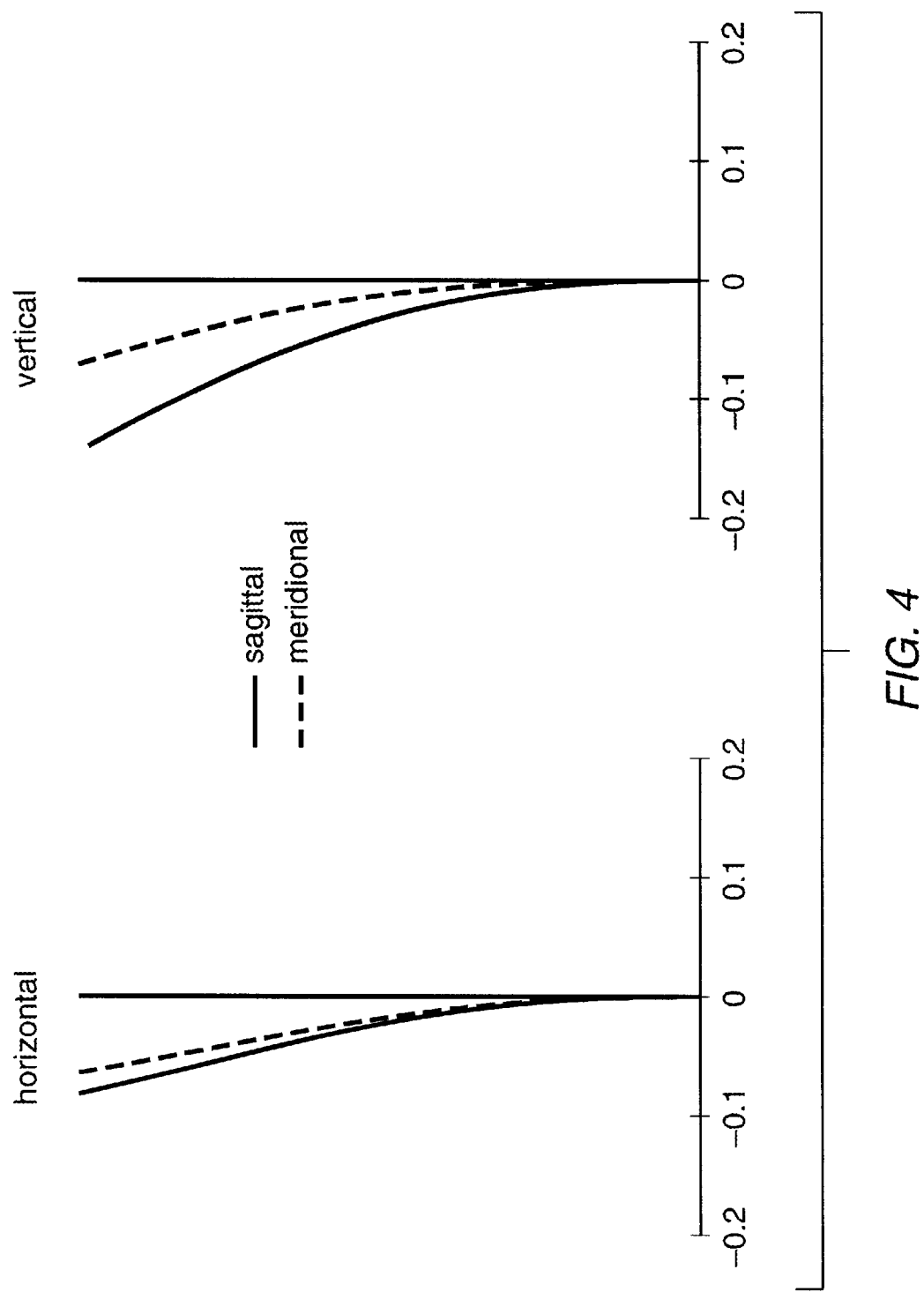
FIG. 4 are field curvature curves showing deviation in the sagittal and meridional image plane of the anamorphic lens of operational example 2.

Turning now in detail to the drawings, FIGS. 1 and 2 show the basic structure of an anamorphic lens of a preferred embodiment, in horizontal and vertical cross-section respectively, in conjunction with a projection lens 30 along an optical axis 50 as part of a digital projection display system including a spatial light modulator 40.

In digital projection, frame sizes are normally available with aspect ratios of 4 to 3 or of 5 to 4. Because these projection formats do not correspond to the best psychological visual perception, anamorphic lens are employed which spread the image in the horizontal direction. This task can be satisfactorily accomplished basically by an afocal anamorphic supplementary lens with relaxed individual refractive powers, a condition which necessarily leads to an increase in its length and of its diameters. An anamorphote of this kind for this reason is uneconomical to produce.

In accordance with the invention, this problem is solved by using an anamorphic lens having an anamorphic factor between 1.3 and 2.0 and including two components. As shown in FIGS. 1 and 2, the first compact afocal component B1 of the anamorphic lens is placed in front of projection lens 30 and comprises a plurality of lens elements U1 and U2 configured for magnification in a first direction transverse to the optical axis 50. Subcomponents U1 and U2 are each cemented components of lenses, preferably two lens elements cemented together as is customary for anamorphotes in Cinemascope film projection and have high refractive powers in the horizontal direction. First afocal part B1 of the anamorphic lens has a telescopic magnification between 0.77 and 0.5.

A second part B2 is included in the anamorphic lens in accordance with the invention. Second anamorphic component B2 has little refractive power in the vertical direction and is placed at a short distance, preferably less than 1.0 mm, behind projection lens 30. Second part B2 comprises at least one lens element configured for magnification in a second direction perpendicular to the first direction, for example in the vertical direction. Both components B1 and B2 are very short in construction and small in diameter.

Conventional anamorphic lenses used in film projection typically consist only of component B1 and have the following properties: a corrected spherical aberration in the center of the image, absence of coma in the horizontal section, and a flat image field. In the vertical section, however, a marked convexity of the sagittal image plane always appears in such lenses whereas the meridional image plane is flat. In anamorphic projections, this astigmatism in the vertical direction is disturbingly noticeable.

In accordance with the invention, by introducing component B2, which has only little refractive power in the vertical direction, the sagittal plane is flattened by reduction of the Petzval sum in the vertical section. Introducing component B2 directly behind projection lens 30 produces this positive effect only in conjunction with anamorphic projectors which have an f-stop greater than 2.5, and whose projection lenses are telecentric. With this arrangement, component B2, which is placed behind the lens, is symmetrically weighted for all cones of rays because of the telecentricity which is required for projection lenses in digital projection, and the variation of aperture error which appears in both sections with f-stop numbers greater than 2.5 can be ignored.

The present invention will be further described using the following two operational examples in which the surfaces 1–3 belong to subcomponent U1, surfaces 4–6 belong to subcomponent U2, surfaces 7–18 belong to the projection lens and surfaces 19–20 belong to second part B2. Cylindrical surfaces are indicated by an asterisk and cylinder surfaces turned by 90° degrees around the optical axis are indicated by a double asterisk. The second column contains the radius of curvature in mm for each surface. The fourth column contains the distances or separations in mm between surfaces, and the last two columns show the indices of refraction $N_e$ and Abbe values $V_e$.

EXAMPLE 1

|  | No. | Radius | Separation | Refractive Index ($N_e$) | Abbe Value ($V_e$) |
|---|---|---|---|---|---|
| $B_1$ $U_1$ | 1 | −151.881* | 4.80 | 1.6521 | 52.86 |
|  | 2 | 40.0* | 13.00 | 1.6206 | 36.37 |
|  | 3 | 245.250* | 53.33 | air |  |
| $U_2$ | 4 | plane | 4.40 | 1.6241 | 36.11 |
|  | 5 | 101.25* | 11.20 | 1.6229 | 60.06 |
|  | 6 | −137.505* | 4. | air |  |
|  | 7 | 79.052 | 4.44 | 1.8040 | 42.00 |
|  | 8 | 428.175 | 17.20 | air |  |
|  | 9 | 41.253 | 2.90 | 1.7584 | 52.10 |
|  | 10 | 20.235 | 35.18 | air |  |
|  | 11 | −42.123 | 23.10 | 1.5945 | 68.00 |
|  | 12 | −34.892 | 11.17 | air |  |
|  | 13 | −304.558 | 3.95 | 1.7617 | 27.37 |
|  | 14 | 115.937 | 2.97 | air |  |
|  | 15 | 908.371 | 6.92 | 1.5945 | 68.00 |
|  | 16 | −82.687 | 0.80 | air |  |
|  | 17 | 90.233 | 9.88 | 1.5945 | 68.00 |
|  | 18 | −168.256 | 0.20 | air |  |
| $B_2$ | 19 | 151.881** | 4.50 | 1.5187 | 63.96 |
|  | 20 | 137.505** | 15. | air |  |
|  | 21 | plane | 102.5 | 1.5187 | 63.96 |
|  | 22 | plane | 3.0 | 1.5105 | 60.98 |
|  | 23 | plane | 0 | air |  |

*cylindrical surface
**cylindrical surface turned by 90 degrees around the optical axis
Aperture ratio: 1:3
Focal lengths: 71.42 and 47.13
Anamorphic factor: 1.515

EXAMPLE 2

|  | No. | Radius | Separation | Refractive Index ($N_e$) | Abbe Value ($V_e$) |
|---|---|---|---|---|---|
| $B_1 U_1$ | 1 | −151.881* | 4.80 | 1.6229 | 60.06 |
|  | 2 | 40.0* | 13.00 | 1.6241 | 36.11 |
|  | 3 | 137.505* | 86.90 | air |  |
| $U_2$ | 4 | plane | 4.40 | 1.6241 | 36.11 |
|  | 5 | 101.25* | 11.20 | 1.6229 | 60.06 |
|  | 6 | −137.505* | 4. | air |  |
|  | 7 | 79.052 | 4.44 | 1.8040 | 42.00 |
|  | 8 | 428.175 | 17.20 | air |  |

EXAMPLE 2-continued

|  | No. | Radius | Separation | Refractive Index ($N_e$) | Abbe Value ($V_e$) |
|---|---|---|---|---|---|
|  | 9 | 41.253 | 2.90 | 1.7584 | 52.10 |
|  | 10 | 20.235 | 35.18 | air |  |
|  | 11 | −42.123 | 23.10 | 1.5945 | 68.00 |
|  | 12 | −34.892 | 11.17 | air |  |
|  | 13 | −304.558 | 3.95 | 1.7617 | 27.37 |
|  | 14 | 115.937 | 2.97 | air |  |
|  | 15 | 908.371 | 6.92 | 1.5945 | 68.00 |
|  | 16 | −82.687 | 0.80 | air |  |
|  | 17 | 90.233 | 9.88 | 1.5945 | 68.00 |
|  | 18 | −168.256 | 0.20 | air |  |
| $B_2$ | 19 | 151.881** | 4.50 | 1.5187 | 63.96 |
|  | 20 | 137.505** | 15. | air |  |
|  | 21 | plane | 102.5 | 1.5187 | 63.96 |
|  | 22 | plane | 3.0 | 1.5105 | 60.98 |
|  | 23 | plane | 0 | air |  |

*cylindrical surface
**cylindrical surface turned by 90 degrees around the optical axis
Aperture ratio: 1:3
Focal lengths: 71.42 and 36.78
Anamorphic factor: 1.942

While several embodiments of the present invention have been shown and described, it is to be understood that many changes and modifications may be made thereunto without departing from the spirit and scope of the invention as defined in the appended claims.

What is claimed is:

1. An anamorphic lens for a digital projection display system comprising a projection lens and an optical axis, said anamorphic lens having an anamorphic factor between 1.3 and 2.0 comprising:

(a) a first afocal part comprising a plurality of lens elements configured for magnification in a first direction transverse to the optical axis in front of the projection lens; and (b) a second part comprising at least one lens element behind the projection lens configured for magnification in a second direction perpendicular to the first direction.

2. The anamorphic lens of claim 1 wherein the lens element of said second part behind the projection lens is separated from the projection lens by a short distance.

3. The anamorphic lens of claim 1 wherein the first afocal part has a telescopic magnification between 0.50 and 0.77 in the first direction.

4. The anamorphic lens of claim 1 wherein the first afocal part comprises two cemented components.

* * * * *